United States Patent [19]
Atkins

[11] Patent Number: 5,625,519
[45] Date of Patent: Apr. 29, 1997

[54] CIRCUIT PROTECTION ARRANGEMENT

[75] Inventor: Ian P. Atkins, Swindon, England

[73] Assignee: Raychem Limited, Swindon, United Kingdom

[21] Appl. No.: 30,392

[22] Filed: Apr. 8, 1993

[30] Foreign Application Priority Data

Oct. 12, 1990 [GB] United Kingdom ............... 9022236
Oct. 12, 1990 [GB] United Kingdom ............... 9022237

[51] Int. Cl.⁶ .................................................. H02H 3/00
[52] U.S. Cl. ...................................... 361/93; 361/54
[58] Field of Search ................... 361/93, 18, 56, 361/57

[56] References Cited

U.S. PATENT DOCUMENTS

| | | | |
|---|---|---|---|
| 3,617,655 | 11/1971 | Fischer | 179/170.4 |
| 3,801,872 | 4/1974 | Zocholl et al. | 317/22 |
| 3,916,220 | 10/1975 | Roveti | 307/251 |
| 4,110,809 | 8/1978 | Cronin | 361/95 |
| 4,202,023 | 5/1980 | Sears | 361/18 |
| 4,241,372 | 12/1980 | Sears | 361/72 |
| 4,423,457 | 12/1983 | Brajder | 361/86 |
| 4,491,892 | 1/1985 | Lehmann et al. | 361/101 |
| 4,513,343 | 4/1985 | Ryczek | 361/101 |
| 4,533,970 | 8/1985 | Brown | 361/58 |
| 4,536,699 | 8/1985 | Baker | 323/276 |
| 4,562,454 | 12/1985 | Schultz et al. | 361/57 |
| 4,594,633 | 6/1986 | Townsend et al. | 361/57 |
| 4,603,234 | 7/1986 | Huet et al. | 179/16 AA |
| 4,604,674 | 8/1986 | Hamel | 361/73 |
| 4,661,879 | 4/1987 | Sato et al. | 361/58 |
| 4,723,190 | 2/1988 | Chung | 361/91 |
| 4,736,268 | 4/1988 | Wagoner | 361/111 |
| 4,744,369 | 5/1988 | Kroll | 128/696 |
| 4,771,357 | 9/1988 | Lorincz et al. | 361/87 |
| 4,799,126 | 1/1989 | Kruse et al. | 361/101 |
| 4,811,156 | 3/1989 | Kroll | 361/58 |
| 4,835,649 | 5/1989 | Salerno | 361/18 |
| 4,853,820 | 8/1989 | Ham et al. | 361/59 |
| 4,937,697 | 6/1990 | Edwards et al. | 361/18 |
| 4,991,051 | 2/1991 | Hung | 361/57 |
| 5,095,261 | 3/1992 | Schoofs | 323/222 |
| 5,319,515 | 6/1994 | Pryor et al. | 361/93 |

FOREIGN PATENT DOCUMENTS

| | | | |
|---|---|---|---|
| 48128/85 | 10/1986 | Australia | H02H 3/087 |
| 147818 | 7/1985 | European Pat. Off. | H02H 3/02 |
| 0147818 | 7/1985 | European Pat. Off. | H02H 3/02 |
| 252541 | 1/1988 | European Pat. Off. | H02H 3/087 |
| 356186 | 2/1990 | European Pat. Off. | H02H 9/02 |
| 2619262 | 2/1989 | France | H02H 9/02 |
| 1233475B | 2/1967 | Germany | |
| 2147471 | 7/1973 | Germany | H02H 7/20 |

(List continued on next page.)

OTHER PUBLICATIONS

British Search Report, GB 9022237.3, Jan. 25, 1991.
British Search Report, GB 9022236.5, Jan. 25, 1991.
International Search Report, PCT/GB91/01760, Jan. 21, 1992.

(List continued on next page.)

*Primary Examiner*—Jeffrey A. Gaffin
*Assistant Examiner*—Sally C. Medley
*Attorney, Agent, or Firm*—Herbert G. Burkard; Bruce M. Bertram; Marguerite E. Gerstner

[57] ABSTRACT

A circuit protection arrangement comprises a series switching circuit that is intended to be connected in a line of the circuit and will switch to an open state when subjected to an overcurrent, and a shunt switching circuit that is open under normal operating conditions but will shunt the overcurrent across the load of the circuit or to ground when triggered by the series switching circuit. Preferably the series switching circuit comprises a switching transistor (4) that is controlled by a control transistor (6), and the shunt switching circuit comprises a shunt switching transistor (9) that is controlled by a shunt control transistor (11) which is itself controlled by the series switching circuit. The shunt switching circuit may be connected to ground or it may be connected to a back-up load or voltage foldback device such as a triac.

20 Claims, 4 Drawing Sheets

FOREIGN PATENT DOCUMENTS

| | | | |
|---|---|---|---|
| 2431167A | 1/1976 | Germany | H02H 7/22 |
| 2440947A | 3/1976 | Germany | G05F 1/58 |
| 2811696 | 9/1979 | Germany | H03K 17/60 |
| 3204338 | 1/1983 | Germany | H02H 7/20 |
| 3433538A | 3/1986 | Germany | G05F 1/569 |
| 3705177 | 6/1987 | Germany | H02H 3/08 |
| 3725390 | 2/1989 | Germany | H02H 3/08 |
| 276572 | 9/1990 | Germany | H02H 7/00 |
| 57-129125 | 8/1982 | Japan | H02H 3/46 |
| 107500 | 1/1989 | Taiwan | H02H 3/00 |
| 148095 | 12/1990 | Taiwan | H02H 3/18 |
| 976862 | 12/1964 | United Kingdom | H02H 3/087 |
| 1157169 | 7/1969 | United Kingdom | H04B 3/36 |
| 1175895 | 1/1970 | United Kingdom | H03H 11/00 |
| 1467055 | 3/1977 | United Kingdom | H02H 3/08 |
| 1481458 | 7/1977 | United Kingdom | H03K 17/08 |
| 1497690 | 1/1978 | United Kingdom | H02H 7/20 |
| 2145593 | 3/1985 | United Kingdom | H02H 3/087 |
| 2167915 | 6/1986 | United Kingdom | H02H 3/22 |
| 2208193 | 3/1989 | United Kingdom | H02H 3/08 |
| 2230665 | 10/1990 | United Kingdom | H02H 3/08 |
| WO8603079 | 5/1986 | WIPO | H03K 17/687 |
| WO9207403 | 4/1992 | WIPO | H02H 3/087 |

OTHER PUBLICATIONS

John Markus, *Electronic Circuit Manual*, p. 595, McGraw–Hill Book Company, New York, 1971.

Erich Gelder and Walter Hirschmann, Siemens Fachbucher, Circuits with Semiconductor Components, vol. 4 pp. 199–202, 1970; a translation of this document is attached.

"Using UC3840 in Designing a Switching Power Supply", *Collection of Transistor Circuit Manufacturing*, pp. 150–161.

"Switching Mode Power Supply", pp. 52–62.

Horst van Pelka, *Siemens–Bauteile–Informationen*, vol. 4, No. 6, 1968, p. 106 (right column).

"Various Types of Power Supply Protection Circuits", *Switching Power Supply Units*, Chapter 8, (pp. 209–229).

CIRCUIT PROTECTION ARRANGEMENT

BACKGROUND OF THE INVENTION

1. Field of the Invention

This invention relates to arrangements and devices for protecting electrical circuits from overcurrents, for example from overcurrents caused by equipment faults or transient overcurrents caused by lightning, electrostatic discharge, equipment induced transients or other threats.

2. Introduction to the Invention

Many circuit protection devices have been proposed for the protection of electronic circuits from overcurrents and overvoltages. For example voltage controlled triacs are employed for protecting certain systems such as telephone circuits from overvoltages. The devices are connected between the lines and ground and will fire in order to shunt any voltage transient when the transient voltage on the line reaches a predetermined value (typically 200 V) and will remain in their on state until the current passing through them is reduced to below a certain value, the holding current. Such devices have the disadvantage that once they have fired they can be latched in their on state by the dc power source of the telephone line which is quite capable of delivering short circuit currents in the order of 200 mA. While conventional triacs normally have a holding current of up to 50 mA, triacs having higher holding currents, for example 300 mA, need to be employed in order to overcome the latching problem. However, these traics have the disadvantage that, when subject to certain transients, they may switch incompletely and remain at a high voltage of 200 V or thereabouts while passing a current of 200 mA with the result that the device and possibly other equipment may be violently damaged. One circuit that has been proposed for use with telephone systems is described in French patent application No. 2,619,262. This circuit comprises a combined overvoltage and overcurrent protection device in which a comparison circuit compares the voltage on one of the lines with a reference voltage and, if it is greater, the transient is shunted across the load and a series electronic switch is opened. This device, however, suffers from the disadvantage that it will not be triggered by a system failure leading, for example, to a short circuit and damage to the series switch may occur due to the currents experienced. In addition, a significant amount of the overcurrent transient may pass through the device before the series switch is opened. The device has the further disadvantage that the voltage protection circuit merely limits the transient voltage to a maximum value. Since significant transient current flows through this part of the circuit, unacceptable heating can occur.

SUMMARY OF THE INVENTION

According to one aspect the present invention provides a circuit protection arrangement, which comprises a series switching circuit that is intended to be connected in a line of the circuit, and will switch to an open state when subjected to an overcurrent, and a shunt switching circuit that is open under normal operating conditions but will shunt the overcurrent across the load of the circuit or to ground when triggered by the series switching circuit.

The arrangement according to the invention has the advantage that it is possible to protect the load circuits not only from threats that cause an overvoltage to be generated, but also from those that cause an overcurrent, eg. systems failures as mentioned above. In addition, the fact that the series switching circuit is actuated directly by the pulse rather than by a shunt switching circuit can reduce the delay in isolating the load circuit from the threat.

DETAILED DESCRIPTION OF THE INVENTION

In a telephone system the shunt switching circuit will be connected directly between one incoming wire and ground and the series switching circuit will be connected in the wire between the shunt switching circuit and the exchange equipment. The second wire will be connected in a corresponding manner. When the system is subjected to a transient the series switching circuit will open and at the same time will cause the shunt switching circuit to close so that the transient is shunted to ground. System current cannot flow from the exchange equipment and cause the shunt switching circuit to latch because the series switching is open. After the transient has passed the system voltage will be dropped across the series switching circuit. This circuit will reset to its normal state as soon as the line to the subscriber is made open circuit, ie. by the subscriber replacing the handset.

In a preferred form of arrangement the series switching circuit includes a series switching transistor that controls the current flow through the series switching circuit. The series switching transistor is preferably controlled by a series control transistor that forms one arm of a voltage divider connected to the base or gate of the series control transistor. The base or gate voltage of the series control transistor is dependent on the voltage drop across the series switching transistor so that, as the voltage drop across the series switching transistor increases, the forward biasing of the series control transistor increases. As the series control transistor becomes more conductive the reverse biasing of the series switching transistor increases causing the switching transistor to switch to its blocking state. As soon as this has occured the voltage drop across the switching transistor will increase substantially causing the control transistor to remain in its "ON" or low resistance state and hence the series switching transistor to remain in its blocking state until the arrangement is reset.

Thus, it is possible for the arrangement to include no resistive components in series with the series switching transistor, so that any voltage drop across the series switching circuit is solely due to the collector-emitter or drain-source voltage drop of the series switching transistor (and any rectifying diodes). The absence of a series resistor reduces the number of load current carrying components which allow easier integration of the device.

The shunt switching circuit preferably comprises a voltage foldback device that is connected between the line of the circuit and a return line or ground. The foldback device should be capable of being triggered by a pulse supplied by the remainder of the shunt switching circuit, and so thyristors or triacs are preferred. The shunt switching circuit preferably has no resistive components in series with the foldback device so that the voltage drop between the line and the return line or ground is solely due to the voltage drop across the foldback device. In this way the energy dissipation in the shunt switching circuit when the transient is shunted is minimized.

The shunt switching circuit may include a shunt switching transistor that is arranged to switch current from the line to the foldback device. In this case the base or gate bias of the shunt switching transistor may be controlled by a shunt control transistor whose base or gate voltage depends on the voltage drop across the series switching circuit. For example, the base or gate of the shunt control transistor may be connected to a voltage divider that spans the switching circuit, one arm of which comprises the shunt control transistor. The base or gate voltage of the shunt control transistor may, in this case, be determined by the series switching circuit so that, for example, switching of the series switching circuit reverse biases the shunt control transistor which causes the shunt switching transistor to become forward biased.

This form of three terminal protection device whether or not it includes the voltage foldback device is novel and so, according to a second aspect the invention provides a circuit protection arrangement, which comprises a switching circuit that is intended to be series connected in a line of the circuit to be protected and which will allow normal circuit currents to pass but will switch to a blocking state when subjected to an overcurrent, the arrangement including a shunt terminal connected to a shunt switching circuit which includes a shunt switching transistor and a shunt control transistor which controls the base or gate bias of the shunt switching transistor and whose base or gate voltage depends on the voltage drop across the series switching circuit, so that, under normal circuit conditions the shunt switching transistor is in a blocking state, but when the switching circuit switches to a blocking state the shunt switching transistor is biased to a conducting state.

The arrangement according to the second aspect of the invention preferably comprises series and shunt switching circuits as described above.

In operation the shunt terminal may be connected directly to the return line of the electrical circuit in order to shunt any overcurrent across the load. In this arrangement the transient current is able to be shunted across the load passing only through a transistor switch, so that the temperature rise in the arrangement can be held to a relatively low value. In some instances it may be left unconnected so that the arrangement is employed as a two-terminal device. Often it will be appropriate to connect the shunt terminal to other components, for example, it may be connected to the return line via a load having substantially the same impedance as that of the line and/or of the electrical circuit, in order to prevent or reduce the occurrence of reflections in the line. Such an arrangement may, for instance, be employed in a local area network (LAN) in which a number of stubs extend from a main bus. If any of the equipment associated with the stubs fails this will alter the load on the bus, with the result that only a limited number of equipment failures can be accommodated before the whole LAN stops functioning. If instead the arrangement switches a matched load into the circuit, the LAN will continue functioning even with a large number of equipment failures.

Alternatively, the shunt terminal may be connected to a transient absorbing load. Where it is likely that the overcurrent will be caused by a fault in the electrical circuit, it may be appropriate for the signal transmitted by the third terminal to switch in a backup system. It may not be necessary for the shunt switching transistor to pass the entire overcurrent. Instead it may be connected to an additional circuit protection device that is capable of passing larger currents than the shunt switching transistor, preferably a foldback or crowbar device such as a thyristor or a triac, in order to trigger the additional device as described above.

Each of the series transistors' parameters will vary with temperature, the characteristic of the control transistor dominating that of the switching transistor since the control transistor is in its high resistance state during normal operation. The changing parameters of the series control transistor causes it to turn ON at lower voltages, thereby reducing the trip current of the arrangement with increasing temperature. This effect can be compensated either by making the resistor in parallel with the control transistor gate and source have a positive temperature coefficient of resistance (PTC) or by making the resistor connected to the switching transistor base or gate have a negative temperature coefficient of resistance (NTC). This latter option is preferred for arrangements that are formed as monolithic devices.

In operation the shunt terminal may be connected directly to the return line of the electrical circuit in order to shunt any overcurrent across the load or, for example in the case of a balanced pair in a telephone system, may be connected to ground. In this arrangement the transient current is able to be shunted across the load or to ground passing only through a foldback device, so that the power dissipated in the arrangement can be held to a relatively low value.

Where the arrangement is intended to be employed with a.c. circuits, the series switching arrangement will be connected to the line via a rectifying bridge circuit. It is preferred for the shunt switching transistor to be connected between the line and the third terminal via a separate rectifying bridge circuit. Alternatively a pair of equivalent circuit protection arrangements according to the invention may be employed, the two arrangements handling different cycles of the a.c. signal. This arrangement has the advantage that the voltage drop across the bridge diodes is removed or reduced.

The overcurrent protection arrangement according to the invention may employ bipolar transistors and/or field effect transistors. Where bipolar transistors are used they are preferably used in a Darlington configuration as the switching transistor in order to reduce the base current required when the transistor is switched ON. This base current must be supplied via a resistor connected between the base and collector of the switching transistor. When the circuit switches to its blocking state the switching transistor base current is diverted through the control transistor (which is now ON) and becomes a leakage current. However, since the voltage drop across the resistor is much higher when the arrangement is in is blocking state, the leakage current is larger than the switching transistor base current. If a Darlington pair or triplet is employed as the switching transistor, the effective d.c. current gain will be increased considerably so that a much higher resistance can be used.

Where field effect transistors are employed, enhancement mode MOSFETS are preferred. The arrangement may be produced as an integrated circuit, in which case the resistors employed in the switching circuit (and in the pulse generator circuit) may be provided by MOSFETs, for example with their gates and drains connected as in NMOS logic. Alternatively, the control transistor and the resistor which together form the voltage divider for the base or gate of the switching transistor may be provided by a complementary n-channel and p-channel pair of FETS connected in the manner of CMOS logic.

The arrangement may be employed as a three terminal arrangement where a single pair of lines incorporates the arrangement. However, five terminal devices may be formed, in which a pair of three terminal arrangements has a common third terminal or even a common shunt switching arrangement. In addition, a four terminal device may be formed, for example for protecting a balanced pair of lines, in which the shunt switching circuit will shunt the threat across the pair.

The arrangement according to the invention may be formed using discrete components or it may be formed monolithically using known techniques.

BRIEF DESCRIPTION OF THE DRAWINGS

Several circuits in accordance with the present invention will now be described by way of example with reference to the accompanying drawings in which.

DETAILED DESCRIPTION OF THE DRAWINGS

Figure 1:
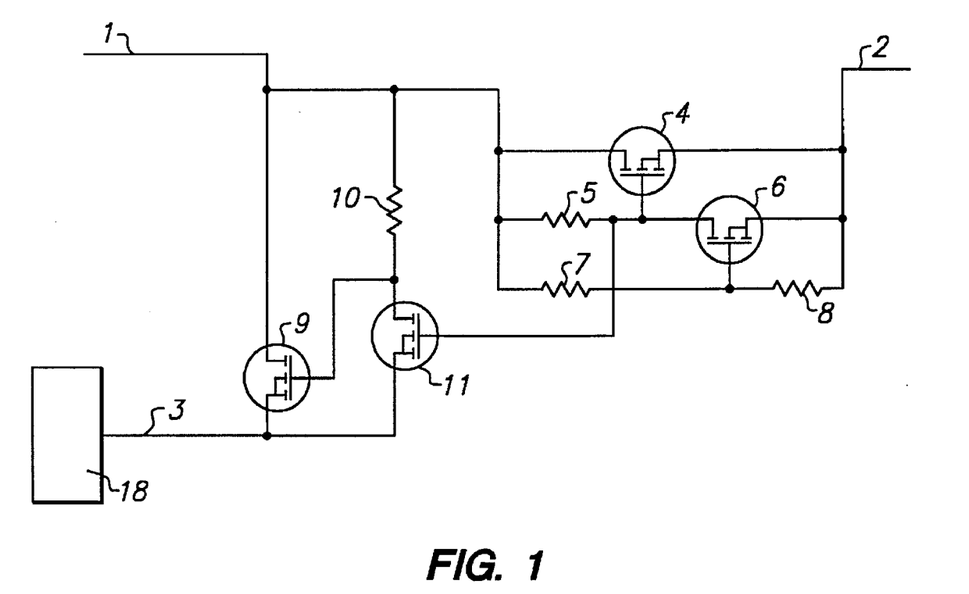
FIG. 1 shows one form of arrangement according to the invention.

FIG. 1 shows a circuit protection device according to the invention suitable for use with a d.c. circuit, and having three terminals 1, 2, and 3. The device is intended to be series connected in a line of the circuit with terminals 1 and 2 connected to the line and terminal 3 connected to the return line, secondary load or backup system. Alternatively, terminal 3 may be connected to a separate or ground point, optionally via a secondary load. As shown, terminal 3 is connected to transient absorbing load 18.

The arrangement has a series switching circuit which comprises a switching transistor 4 connected in series with the line with its gate connected to a voltage divider which spans the switching transistor 4 and which is formed from a 1 Mohm resistance 5 and a control transistor 6. The gate of the control transistor is connected to a further potential divider formed from two 1 Mohm resistances 7 and 8 which span the switching transistor 4 so that the gate voltage of the control transistor 6 is held at half the voltage drop across switching transistor 4.

The arrangement also has a shunt switching circuit connected to terminal 3 which comprises a shunt switching transistor 9 that controls the flow of current between terminal 1 and 3. The gate of the shunt switching transistor 9 is connected to a voltage divider which spans the switching transistor 9 and which is formed from a 1 Mohm resistance 10 and a shunt control transistor 11. The gate of the shunt control transistor 11 is connected to the same potential divider as is the gate of transistor 4. All the transistors employed in this arrangement are enhancement mode MOSFETs.

In operation terminals 1 and 2 will be connected in a line of the circuit. When no current flows through the circuit all the transistors are in their high resistance or "OFF" state so that the series resistance of the arrangement is about 2 Mohms due to resistances 7 and 8. As the voltage is increased no current will flow until the voltage at the supply terminal 1 reaches the switch on threshold of transistor 4 since transistor 6 is OFF with a resistance in the order of $10^{12}$ ohms and the gate of transistor 4 is therefore held at the input voltage. Once this voltage is exceeded transistor 4 goes into its conductive state and the V/I characteristic follows a line of resistance equivalent to that of the ON state resistance of transistor 4 but offset by the switch on threshold of transistor 4 (about 2 V). At such levels of applied voltage transistor 11, whose gate is maintained at the same voltage as that of transistor 4, is in its ON state which causes the shunt switching transistor to be zero biased and therefore in its OFF state. The arrangement typically has a series resistance of 200 m ohms with a voltage drop of 2 V, and a shunt resistance of 1M ohm in its normal operating condition.

If the voltage drop across switch transistor 4 increases due to an overcurrent transient or circuit fault the gate voltage of control transistor 6 will rise until it reaches the switch ON threshold of control transistor 6 whereupon the gate voltage of switch transistor 4 will fall to the value of its source voltage and the transistor will turn OFF. At the same time the gate voltage of shunt control transistor 11 will fall to approximately its source voltage and transistor 11 will turn OFF causing the gate of shunt switching transistor 9 to become forward biased and so turning it ON. Since the voltage drop across series switching transistor 4 in its OFF state is greater than in its ON state, series control transistor 6 will remain forward biased causing the arrangement to stay permanently in its tripped state with series switching transistor 4 in its OFF state and shunt switching transistor 9 in its ON state.

Figure 2:
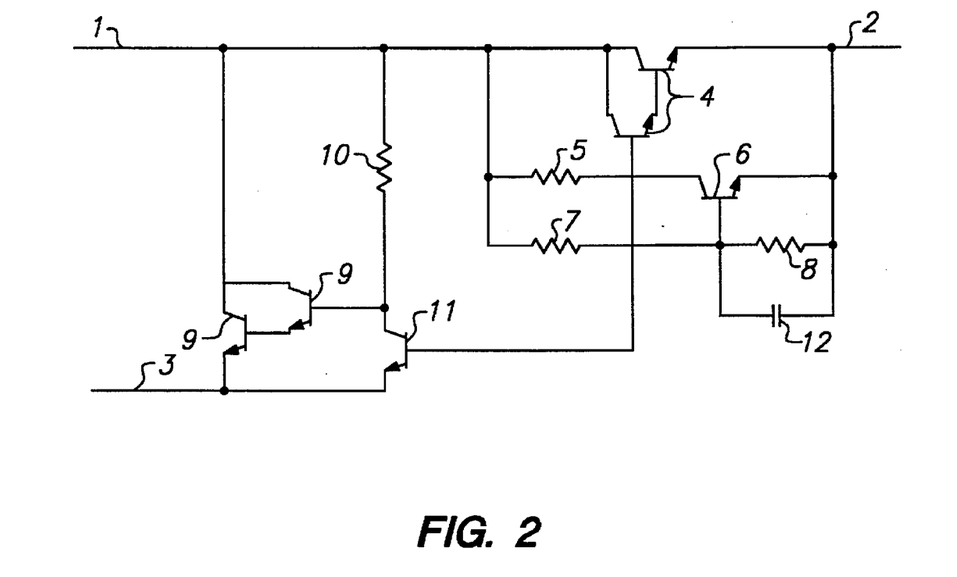
FIG. 2 shows a modification of the arrangement of FIG. 1.

FIG. 2 shows a modification of the circuit of FIG. 1 in which the field effect transistors have been replaced by bipolar junction transistors, and, in the case of series switching transistor 4 and shunt switching transistor 9, by a Darlington pair. In addition a 1 microfarad capacitor 12 is included in parallel with resistance 8. The capacitor 12 prevents tripping of the arrangement by short current transients. If desired the value of the capacitor can be less than 1 microfarad, such an arrangement giving a sufficient time constant for use with, for example, tungsten filament lamps.

Figure 3:
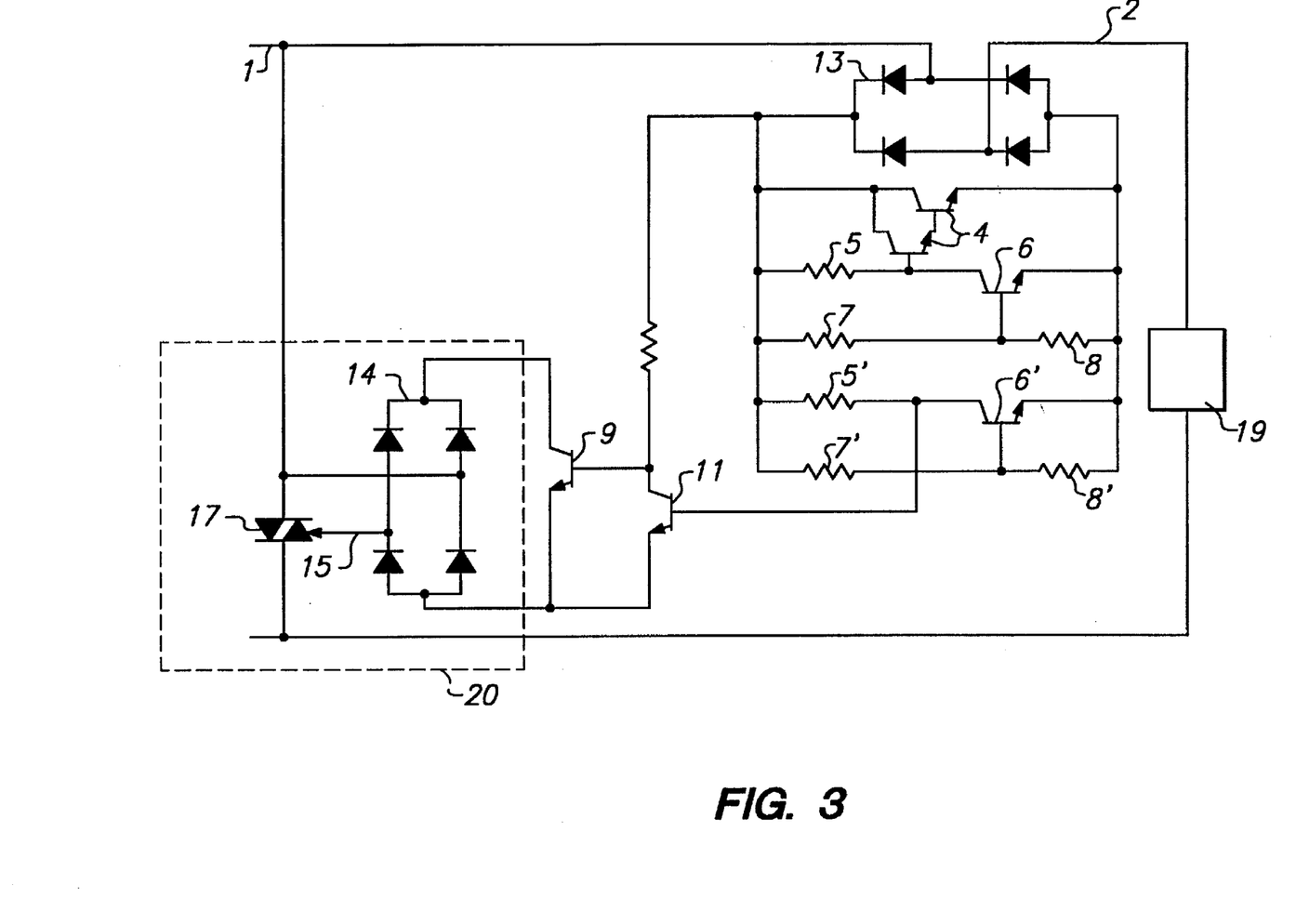
FIG. 3 shows a modification of the arrangement according to the invention.

FIG. 3 shows a modification of the arrangement which may, for example, be used in telephone equipment. In this arrangement the shunt line 15 is connected to the base of a triac 17 formed from two thyristors. Load 19 is connected in the circuit between terminal 2 and triac 17.

In this circuit the base of the shunt control transistor 11 is not connected to the base of the series switching transistors 4 as in FIG. 2, but instead is held in a further voltage divider formed from transistor 6' and resistor 5'. The base of transistor 6' is held in another voltage divider formed by resistors 7' and 8'.

When the arrangement is subjected to a transient the series switching transistor 4 will switch OFF as described above, and the shunt switching transistor 9 will turn ON, thereby causing part of the overcurrent to be injected into the base of the triac 17 and switching the triac ON. A backup circuit 20 is formed from triac 17, shunt line 15, and rectifying bridge 14.

The purpose of using a second voltage divider circuit 5', 6', 7' and 8' is to control the shunt switching circuit and remove any dependence of the switching current on the load of the circuit.

Figure 4:
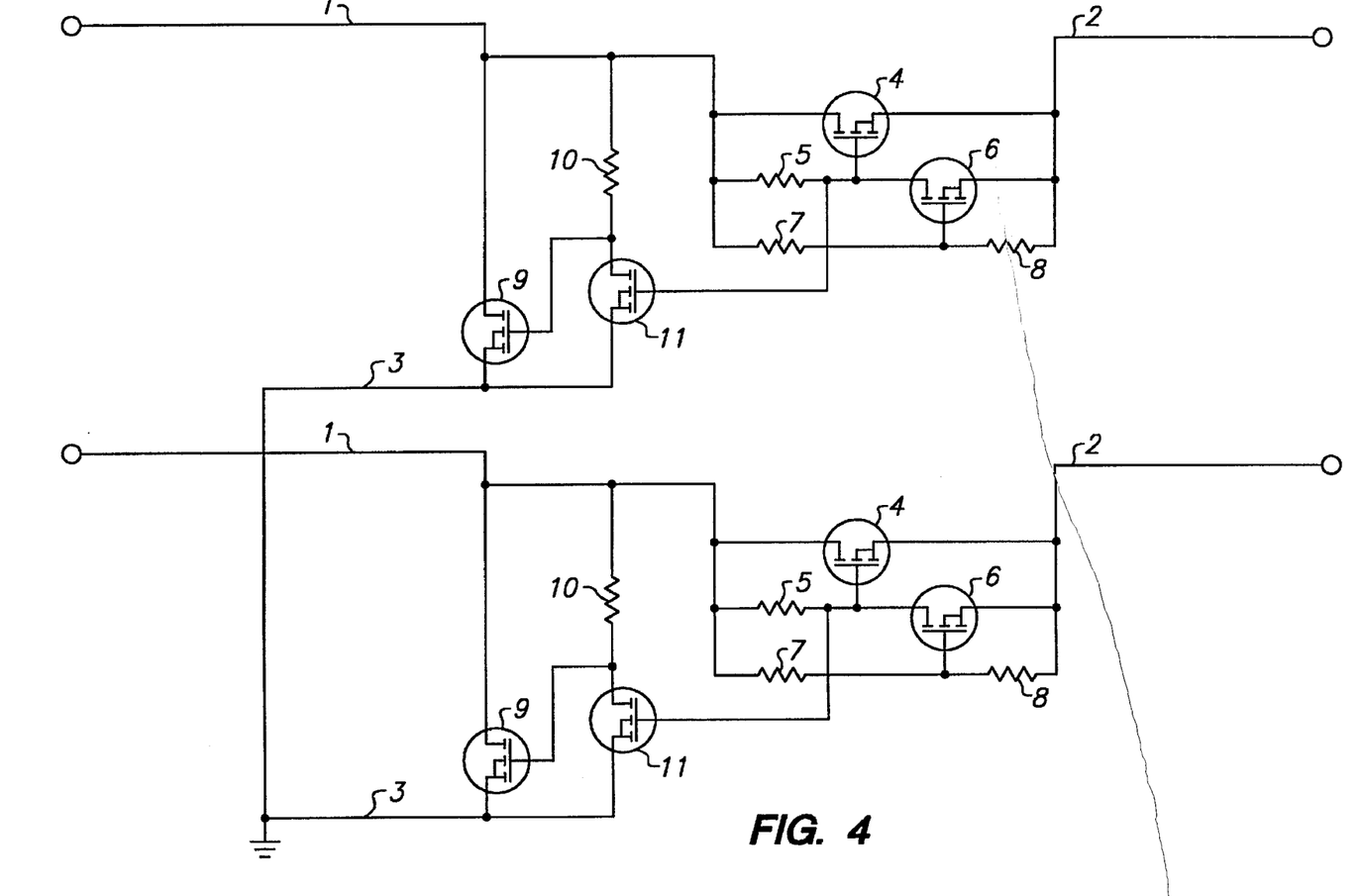
FIGS. 4 and 5 show a pair of the arrangement of FIG. 1 according to the invention.
Figure 5:
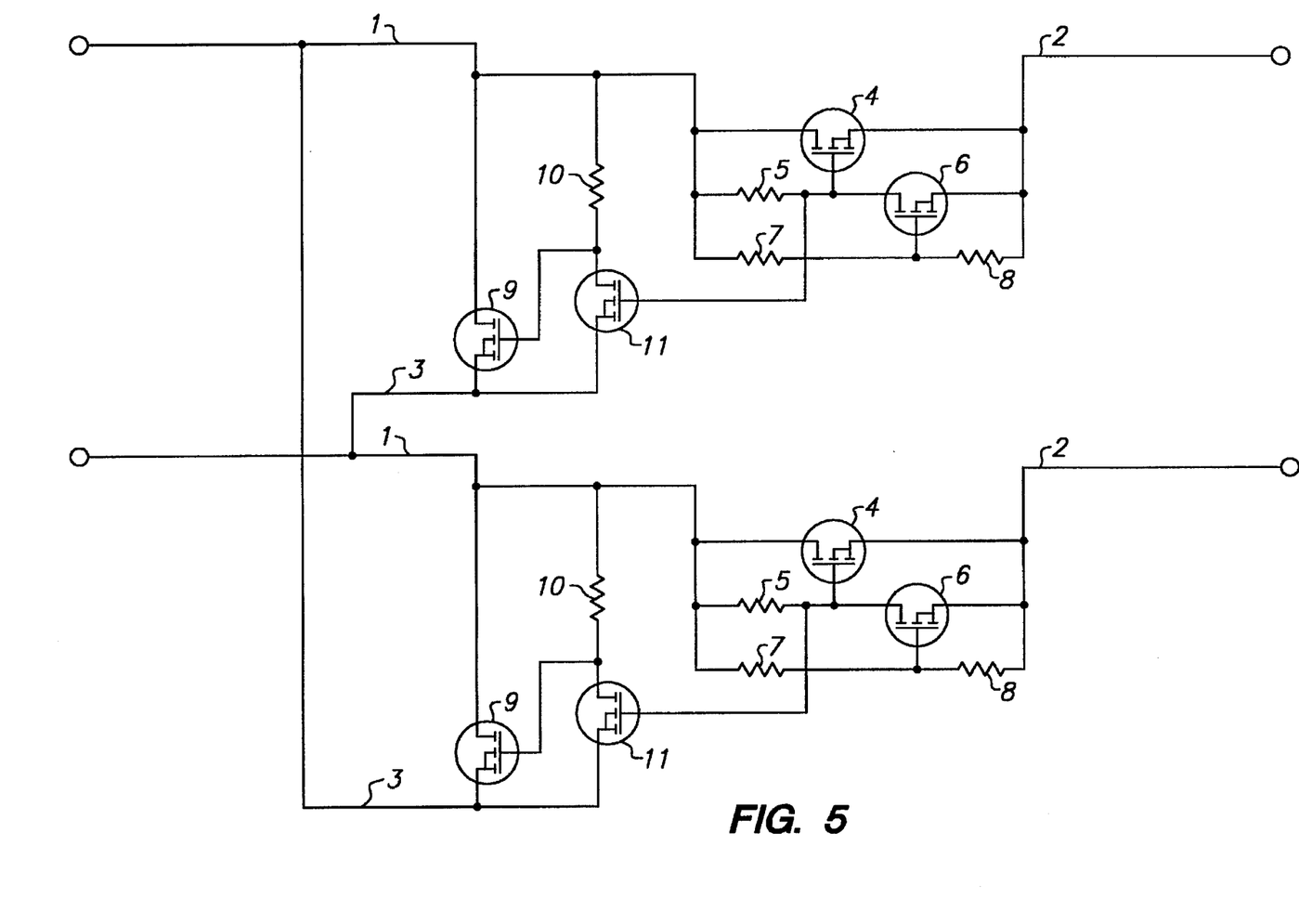

FIG. 4 shows a pair of the arrangement of FIG. 1 which shunt to a common ground. FIG. 5 shows a pair of the arrangement of FIG. 1 which shunt between the pair of lines 1, 3.

I claim:

1. A circuit protection arrangement which comprises
   (1) a series switching circuit which
      (a) has an input and an output,
      (b) is series connected in a line of a circuit to be protected,
      (c) will allow normal circuit currents to pass under normal operating conditions, and
      (d) will switch to produce an open state in the line when subjected to an overcurrent, and
   (2) a shunt switching circuit which
      (a) is connected to the input of the series switching circuit and to a return line of the circuit to be protected,
      (b) is open under normal operating conditions, and
      (c) will shunt the overcurrent to the return line of the circuit to be protected when the series switching circuit switches to produce the open state in the line of the circuit to be protected.

2. An arrangement as claimed in claim 1, wherein the series switching circuit includes
   (1) a series switching transistor which is selected from bipolar transistors and field effect transistors and which
      (a) if it is a bipolar transistor comprises a collector, an emitter and a base, and
      (b) if it is a field effect transistor comprises a drain, a source and a gate;
   (2) optionally one or more rectifying diodes in series with the switching transistor;
   (3) a series control transistor which is selected from bipolar transistors and field effect transistors and which
      (a) if it is a bipolar transistor comprises a collector, an emitter and a base,
      (b) if it is a field effect transistor comprises a drain, a source and a gate, and
      (c) determines the base or gate voltage of the series switching transistor; and
   (4) a voltage divider which
      (a) spans the series switching transistor, and
      (b) determines the base or gate voltage of the series control transistor;
the arrangement having no resistive components in series with the series switching transistor so that voltage drop across the series switching circuit is solely due to a voltage drop across the collector-emitter or drain-source of the series switching transistor and any rectifying diodes where present.

3. An arrangement as claimed in claim 1, where in the shunt switching circuit comprises a voltage foldback device that is connected between the line of the circuit and a return line or ground.

4. An arrangement as claimed in claim 3, wherein the foldback device is a thyristor or a triac.

5. An arrangement as claimed in claim 3, wherein the shunt switching circuit has no resistive components in series with the foldback device so that the voltage drop between the line and the return line or ground is solely due to the voltage drop across the foldback device.

6. An arrangement as claimed in claim 3, wherein the shunt switching circuit includes a shunt switching transistor that is arranged to switch current from the line to the foldback device to trigger the foldback device.

7. An arrangement as claimed in claim 6, wherein the shunt switching circuit includes a shunt control transistor which controls the base or gate bias of the shunt switching transistor and whose base or gate voltage depends on the voltage drop across the series switching circuit.

8. An arrangement as claimed in claim 7, wherein the base or gate of the shunt control transistor is connected to a voltage divider that spans the series switching circuit, one arm of the voltage divider comprising the series control transistor.

9. A circuit protection arrangement, which comprises
   (1) a series switching circuit which
      (a) has an input and an output,
      (b) is series connected in a line of a circuit to be protected,
      (c) will allow normal circuit currents to pass under normal operating conditions, and
      (d) will switch to produce an open state in the line of the circuit to be protected when subjected to an overcurrent,
   (2) a shunt terminal connected to a return line of the circuit to be protected, and
   (3) a shunt switching circuit, which
      (a) is connected to the input of the series switching circuit and to the shunt terminal and
      (b) includes
         (i) a shunt switching transistor which is selected from bipolar transistors and field effect transistors and which
            a. if it is a bipolar transistor comprises a collector, an emitter and a base, and
            b. if it is a field effect transistor comprises a drain, a source and a gate, and
         (ii) a shunt control transistor which
            a. is selected from bipolar transistors and field effect transistors and which
               i. if it is a bipolar transistor comprises a collector, an emitter and a base, and
               ii. if it is a field effect transistor comprises a drain, a source and a gate,
            b. controls the base or gate bias of the shunt switching transistor, and
            c. has a base voltage or gate voltage which depends on the voltage drop across the series switching circuit,
so that, under normal operating conditions, the shunt switching transistor is in an open state, and when the series switching circuit produces the open state in the line of the circuit to be protected, the shunt switching transistor is biased to a conducting state.

10. An arrangement as claimed in claim 9, wherein the series switching circuit includes a series switching transistor that limits the current flow through the series switching circuit.

11. An arrangement as claimed in claim 10, wherein the series switching transistor is controlled by a series control transistor whose base or gate voltage is dependent on the voltage drop across the series switching transistor, so that as the voltage drop across the series switching transistor increases, the forward biasing of the series control transistor increases, causing the series control transistor to go to a low resistance state which causes the series switching transistor to switch to a high resistance state.

12. An arrangement as claimed in claim 11, wherein the base or gate of the shunt control transistor is connected to a voltage divider that spans the series switching circuit, one arm of the voltage divider comprising the series control transistor.

13. An arrangement as claimed in claim 11, which includes no resistive components in series with the series switching transistor.

14. An arrangement as claimed in claim 9, wherein the shunt terminal is connected directly to a return line.

15. An arrangement as claimed in claim 9, wherein the shunt terminal is connected to a return line via a load having substantially the same impedance as that of the line.

16. An arrangement as claimed in claim 9, wherein the shunt terminal is connected to a backup circuit which is brought into operation when the overcurrent is experienced.

17. An arrangement as claimed in claim 9, wherein the shunt terminal is connected to a transient absorbing load.

18. A circuit protection unit which comprises a pair of arrangements which are arranged to be series connected in a pair of current-carrying lines so that an overcurrent in either line will be shunted across a load of the circuit, each of the pair of arrangements comprising (1) a series switching circuit that is connected in a line of the circuit and will switch to produce an open state in the line when subjected to an overcurrent, and (2) a shunt switching circuit that is open under normal operating conditions but will shunt the overcurrent across the load of the circuit when triggered by the series switching circuit.

19. A circuit protection arrangement which comprises
   (1) a series switching circuit which
      (a) has an input and an output,
      (b) is series connected in a line of a circuit to be protected,
      (c) will allow normal circuit currents to pass under normal operating conditions, and
      (d) will switch to produce an open state in the line of the circuit to be protected when subjected to an overcurrent, and
   (2) a shunt switching circuit which
      (a) is connected between the input of the series switching circuit and ground,
      (b) is open under normal operating conditions, and
      (c) will shunt the overcurrent to ground when the series switching circuit produces the open state in the line of the circuit to be protected.

20. A circuit protection unit which comprises a pair of arrangements which are arranged to be connected in a pair of current-carrying lines of a circuit to be protected so that an overcurrent in either line will be shunted to a common ground, each of the pair of arrangements comprising
   (1) a series switching circuit which
      (a) has an input and an output,
      (b) is series connected in a current-carrying line of the circuit to be protected,
      (c) will allow normal circuit currents to pass under normal operating conditions, and
      (d) will switch to produce an open state in the current-carrying line of the circuit to be protected when subjected to an overcurrent, and
   (2) a shunt switching circuit which
      (a) is connected between the input of the series switching circuit and ground,
      (b) is open under normal operating conditions, and
      (c) will shunt the overcurrent to ground when the series switching circuit produces the open state in the current-carrying line of the circuit to be protected.

* * * * *